March 10, 1959   A. G. H. VANDERPOEL ET AL   2,876,793
PRESSURE REGULATOR-FILTER DEVICE
Filed Aug. 16, 1955
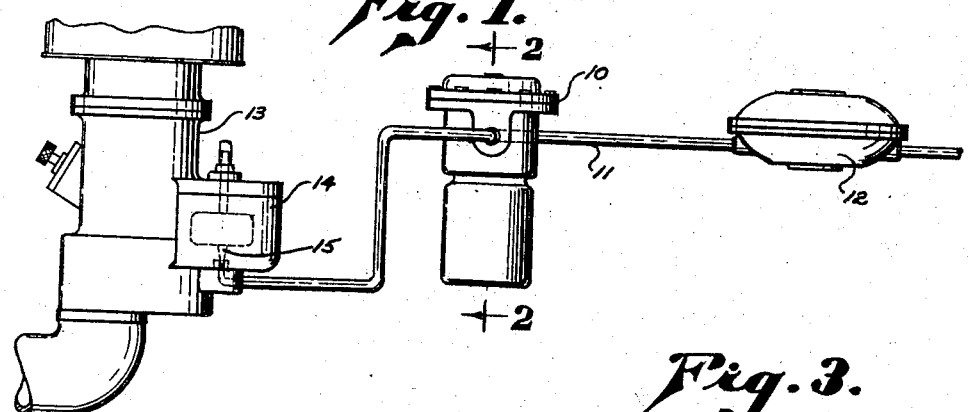
Fig. 1.
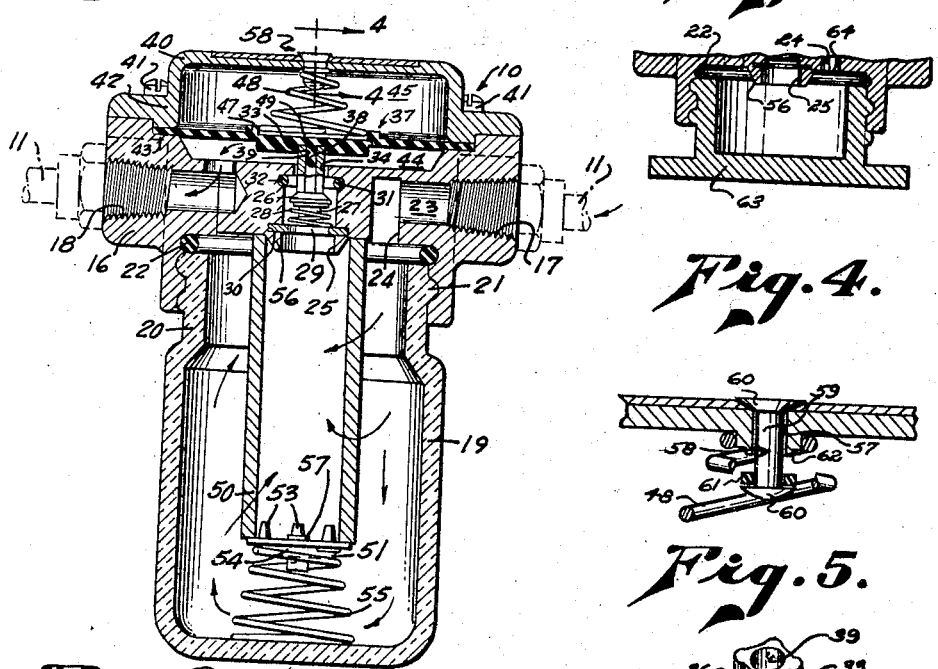
Fig. 2.
Fig. 3.
Fig. 4.
Fig. 5.
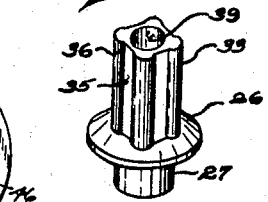
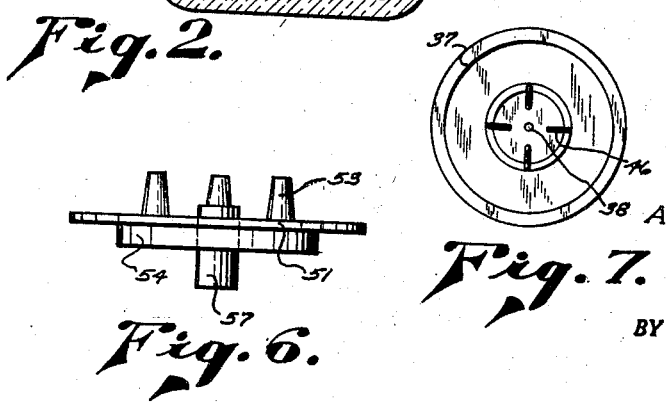
Fig. 6.
Fig. 7.
ALBERT G. H. VANDERPOEL
HAROLD J. MAILHOT
INVENTOR.
BY United States Patent Office 2,876,793
Patented Mar. 10, 1959

2,876,793

PRESSURE REGULATOR-FILTER DEVICE

Albert G. H. Vanderpoel and Harold J. Mailhot, Gardena, Calif.

Application August 16, 1955, Serial No. 528,713

7 Claims. (Cl. 137—505.42)

This invention relates generally to fluid pressure regulating and filtering devices in which fluid fuel delivered by a pump at a relatively high pressure and under pulsating flow conditions is subjected to pressure regulation dropping the fluid pressure to a lower value and also to filtering action. More particularly, the invention concerns such improvements in devices of the above type as improve the operating efficiency thereof with regard to better control of the drop in fluid pressure and quicker response to changed conditions of fluid delivery, together with certain added safety features benefitting the operation of the device.

The invention has particular reference to specific improvements in fluid pressure regulating and filtering devices of the type disclosed and shown in United States Letters Patent No. 2,707,051, issued to H. J. Mailhot and Albert G. H. Vanderpoel on Apirl 26, 1955. As disclosed in that patent, the purpose of the pressure regulator and filter, when connected between the fuel pump and a carburetor float chamber into which the pump pressurized fuel is admitted past the usual float controlled valve, is to deliver fluid fuel to the float chamber at a regulated pressure best suited for float controlled operation. In furtherance of this and other purposes, including improved efficiency of operation of the moving parts of the pressure regulating device, it is a major object of the present invention to provide for centering in axial alignment of the movable parts of the regulator during all phases and conditions of regulator operation. In particular, the regulating valve movable within a fluid discharge passage into and out of engagement with a valve seat to control fluid flow through the regulator, is centered at its opposite end portions by the actuating diaphragm and spring for true axial movement within the passage. As a result, the valve, which is spaced from the wall of the passage to by-pass fluid therearound, is enabled to seat squarely and positively upon the valve seat under various changed operating conditions, thereby increasing the efficiency of valve operation.

Also in connection with improved function of the movable parts, the flexible diaphragm connected to the valve at the discharge side of the passage includes spaced projections extending toward the regulator head and preventing complete closure of the diaphragm against the head and cutting off fuel delivery, as, for example, when the demand for fuel from the regulator is suddenly increased. The diaphragm itself is maintained in transversely extending relation to the axis of the regulator passage by a ring-shaped projection formed at the opposite side of the diaphragm and acting to center the enlarged end of a frustro-conical spring bearing against the diaphragm, there being a rigid insert positioned between the spring and the diaphragm to distribute the spring loading.

Improved separation of foreign particles from the fluid fuel passing through the regulator is achieved by the use of magnetic means in combination with a particle filter at the inlet side of the discharge passage, the magnetic means serving to attract and separate ferrous particles from the fuel. In those instances where a glass bowl containing an elongated filter element is not acceptable, an annular shaped filter such as a screen may be inserted between a shallow chamber forming plug and the inlet side of the regulator body to which the plug is removably attached.

Finally, the invention provides against leakage of fuel from the diaphragm chamber through the vented cover therefor by means of a check valve inserted within the vent. The check valve is so designed that, upon ingress of pressurized fluid fuel into the chamber adjacent the valve as through a fracture in the diaphragm, the fuel pressure will act upon the check valve to close the vent.

The above and other features and objects of the present invention will be better understood from the following detailed description of the typical embodiment represented in the accompanying drawing, in which:

Figure 1 is a general view showing the pressure regulating and filtering unit installed in a fuel line between an engine carburetor and a gasoline pump;

Fig. 2 is an enlarged cross sectional view of the unit taken on line 2—2 of Fig. 1;

Fig. 3 is an enlarged cross sectional and fragmentary view of a modified form of the device;

Fig. 4 is an enlarged cross sectional view taken on line 4—4 of Fig. 2;

Fig. 5 is an enlarged perspective view of an improved regulating valve incorporated in the unit;

Fig. 6 is an enlarged elevation showing the magnet carrying closure for the filter; and Fig. 7 is a plan view of the flexible diaphragm incorporated in the unit.

Referring first to Fig. 1, the regulator-filter unit generally indicated at 10 is shown to be connected into the fuel line 11 between the usual gasoline diaphragm pump 12 and the carburetor 13. The fuel being pumped through line 11 enters the carburetor float chamber 14 under control of any of the usual float valves conventionally indicated at 15. The device 10 is capable of delivering the fluid fuel to the float chamber at a constant predetermined and safe operating pressure regardless of pump pressure fluctuations, so as to prevent flooding or excessive liquid level-buildup in the float chamber. In addition, any foreign particles in the fluid fuel are separated by the device as will appear.

As illustrated in Fig. 2, the improved device 10 comprises a head 16 having an inlet 17 and an outlet 18 connectible into the fuel line indicated in broken lines 11. Removably attached to the head is a chamber 19 typically in the form of a glass or other transparent container having a threaded neck 20 screwed at 21 into a threaded bore of the head against a rubber O-ring 22. The chamber 19 is in communication with the inlet 17 through bore 23 and passage 24 in the head.

The head contains a centrally located counterbore 25 which receives the flow control valve 26 having a lower stem 27 surrounded by the upper smaller end of a frustroconical coil spring 28, the lower enlarged end of which engages the counterbore 25 in centered condition and seats against the snap ring 29. The latter is received within an annular slot or groove 30 within the head and communicating with the counterbore. Since the frustroconical coil spring is centered within the counterbore, it acts to center and urge the valve in an upward or closing direction toward and against another rubber O-ring 31 securely retained within an annular recess 32 at the upper end of the counterbore, to provide a leak-proof seat for the valve.

The valve also has an upper stem 33 extending with open clearance through bore 34, which is somewhat smaller than the counterbore. As shown in Fig. 5, the upper stem 33 is not cylindrical in shape, but has spaced around its sides longitudinally extending side flats 35 and longitudinally extending rounded corners 36 interposed between the flats. Since the bore 34 is cylindrical, the enlarged spaces formed between the side flats 35 and the bore provide additional open clearance between the stem and the bore through which increased quantities of fluid fuel may more readily flow so as to improve the fuel delivering characteristics of the regulator unit. The valve itself is, of course, tapered as shown in Fig. 5 to seat squarely against the O-ring 31, the valve being centered for axial movement within the bore and counterbore.

The upper stem 33 of the valve is centered with respect to the bore 34 by the flexible diaphragm generally indicated at 37 and having a central projection 38 fitting closely within recess 39 formed at and within the upper end portion of the upper stem 33, the projection preventing lateral displacement of the stem. Accordingly, since both the upper and the lower valve stems are centered, the valve has capacity to float freely within the bore and counterbore and toward and away from the O-ring seat 31, with assured complete closure against the seat by virtue of the positively centered condition of the valve.

The head 16 carries a cap or cover 40 retained by screws 41 and having an annular flange 42 which clamps the flexible diaphragm 37 against the head shoulder 43, the diaphragm extending transversely with respect to the axis of the bore and forming a fuel receiving chamber 44 with the head and an air chamber 45 with the cap. As better shown in Fig. 7, the underside of the diaphragm has formed thereon several additional projections 46 spaced and extending radially from the central projection 38 and circumferentially spaced from each other. The projections 46 prevent complete closure of the diaphragm against the head to assure against shutting off of fuel delivery under severely reduced pressure conditions within fluid fuel chamber 34, under which conditions fuel delivery continues from bore 34 through the spaces formed between the projections 46.

Referring again to Fig. 2, the upper side of the diaphragm has formed thereon an annular projection 47 generally opposite the radial projections 46. The annular projection surrounds and centers the enlarged lower end of frustro-conical spring 48, which is retained between the diaphragm and the cover 40 and urges the diaphragm in a direction tending to unseat the valve. To further stabilize the diaphragm in its transversely extending condition during regulator operation, a thin, transversely extending rigid insert 49 is positioned between the diaphragm and the lower end of spring 48.

Chamber 19 contains a filter element 50 preferably in the form of a porous tube having a bottom closure 51, which is shown in Fig. 6 to include three fingers 53 projecting within and centering the closure against the lower end of the porous tube. A flange 54 extending downward from the closure acts to center the smaller upper end of frustro-conical spring 55, the latter being retained between the bottom of chamber 19 and the closure to urge the upper end of the porous cylinder against the head. For centering purposes, the underside of the head surrounding the counterbore is formed with a depending tapered flange 56 extending within and centering the upper end of the filter element. The closure 51 is shown in Fig. 6 mounting a permanent magnet 57 extending on opposite sides of the closure and adapted, during regulator operation, to attract small ferrous particles contained within the fluid fuel, so as to assure their segregation. Alternately, the frustro-conical spring 55 may comprise a permanently magnetized material for the same purposes, in which case permanent magnet 57 is not needed.

As will be understood, springs 28 and 48 may be selected to have such differential compression resistances in relation to the area of diaphragm 37 as may maintain a predetermined fuel pressure, say, on the order of two pounds per square inch, at the outlet 18. This pressure will be below the pump discharge pressure, but yet sufficiently high to assure adequate and safe pressure delivery of the fuel to the float chamber. Fuel entering the device through the inlet 17 flows downwardly into chamber 19, and then inwardly through the filter element 50 to be discharged under control of the regulator valve 26 to the outlet 18.

As shown in Figs. 2 and 4, the cap 40 contains a central vent 57 within which check valve assembly 58 is mounted. The check valve assembly includes a stem 59 extending through the vent and having heads 60 formed at its opposite ends, there being a ring-shaped sealing element 61 loosely retained on the stem 59 between the lower head 60 and a flange 62 depending from the cap around the vent. Under normal operating conditions, the air chamber 45 communicates with the atmosphere exterior of the regulator through the vent 57 so that atmospheric pressure conditions are established within the chamber. However, should the diaphragm for any reason rupture in use, pressurized fuel escaping into the air chamber will close the check valve to prevent fuel leakage from the regulator, the pressure of the fuel acting against the lower head 60 to displace the check valve upwardly, the sealing member 61 as a result being tightly clamped between the lower head and the flange 62 to prevent escape of fuel through the vent.

In those instances where a glass chamber such as that indicated at 19 is not desirable, a chambered metallic plug 63 such as that shown in Fig. 3 may be threaded into the underside of the head against the O-ring 22 shown, in which case a suitable annular filter element 64 may be held between the O-ring and the underside of the head 16 between the plug chamber and the annular passage 24, the screen being centered by the tapered boss 56 surrounding the counterbore.

We claim:
1. An improved fluid fuel pressure regulating device, comprising a head containing a passage extending axially between inlet and discharge sides thereof and having a fluid inlet and outlet communicating respectively with said sides, means at the inlet side of the head through which fluid is flowable from said inlet to said passage, a cover connected to said head and forming therewith a space at the discharge side thereof, a valve seat in said passage, said seat comprising a circular cross section rubber O-ring extending concentrically about said passage axis, a valve positioned within said passage for axial movement into and out of engagement with said seat, said valve having a tapered body engageable with said seat and a pair of stems extending axially oppositely from said body within said passage in open spaced relation to the wall thereof, means centered by said head and engaging and centering the valve stems within said passage so that the valve is free to float therein without engaging said wall, said means including a flexible elastomer diaphragm extending transversely completely across said space and closely adjacent the discharge side of said passage for open exposure to fluid pressure at the discharge side of the head and said diaphragm having a part interfitting the valve stem that extends through said O-ring whereby said valve remains cushioned throughout its movement by said diaphragm and seat, said means also including a spring within said passage acting to seat the valve, and another spring positioned between said diaphragm and cover and acting against the diaphragm to unseat the valve.

2. The invention as defined in claim 1 in which said valve stem which extends through the O-ring projects into said space and contains a recess at the free end thereof, and said diaphragm part comprises a projection fitting within the recess.

3. The invention as defined in claim 1 in which said diaphragm has other spaced projections formed thereon in transverse offset relation to said passage and extending toward the discharge side of said head to engage said side between said passage and outlet so as to limit diaphragm movement toward said side without obstructing fuel flow to said outlet.

4. The invention as defined in claim 3 in which said diaphragm has a ring-shaped projection at the side thereof opposite said other projections and extending around the end of said other spring acting against the diaphragm.

5. The invention as defined in claim 4 including a transversely extending rigid support inserted between the diaphragm and the end of said spring acting thereagainst.

6. The invention as defined in claim 1, in which said spring acting to seat the valve is conical helical and has a large end contacting the wall of said passage and a small end surrounding the other valve stem.

7. The invention as defined in claim 1 in which said passage comprises a bore and counterbore, and in which said valve stem which extends through the O-ring also extends through the bore out of contact with the bore wall and has longitudinally extending flattened sides forming with the bore wall enlarged clearance therebetween for passing fluid through the bore, and said valve body and O-ring seat extend within the counterbore.

References Cited in the file of this patent
UNITED STATES PATENTS

| | | |
|---|---|---|
| 29,246 | Champion | July 24, 1860 |
| 245,592 | Westinghouse | Aug. 9, 1881 |
| 1,465,654 | Radtke | Aug. 21, 1923 |
| 1,807,200 | Dennison | May 26, 1931 |
| 2,077,040 | Creveling | Apr. 13, 1937 |
| 2,156,823 | Stettner | May 2, 1939 |
| 2,208,261 | Jackson | July 16, 1940 |
| 2,301,031 | Ferguson | Nov. 3, 1942 |
| 2,380,459 | Niesemann | July 31, 1945 |
| 2,437,221 | Cox | Mar. 2, 1948 |
| 2,645,062 | Senesky | July 14, 1953 |
| 2,648,438 | Cox | Aug. 11, 1953 |
| 2,690,842 | Spluvac | Oct. 5, 1954 |